United States Patent [19]
Nichols, Jr.

[11] 3,748,428
[45] July 24, 1973

[54] PROCESS OF MAKING A METAL SCREEN

[75] Inventor: George E. Nichols, Jr., Norfolk, Mass.

[73] Assignee: Bird Machine Company, Inc., South Walpole, Mass.

[22] Filed: Jan. 19, 1972

[21] Appl. No.: 218,951

Related U.S. Application Data
[62] Division of Ser. No. 50,136, June 26, 1970, Pat. No. 3,664,502.

[52] U.S. Cl............................ 219/69 M, 204/143 M
[51] Int. Cl............................ B23p 1/08, B23p 1/04
[58] Field of Search...................... 219/69 E, 69 M; 209/270, 397; 204/143 M

[56] References Cited
UNITED STATES PATENTS

| 239,837 | 4/1881 | Pinder et al. ....................... 209/397 |
| 3,200,231 | 8/1965 | Bejat .................................. 219/69 E |
| 3,276,584 | 10/1966 | Mathewson ..................... 209/270 X |

FOREIGN PATENTS OR APPLICATIONS

| 108,053 | 7/1937 | Australia............................. 209/397 |

Primary Examiner—R. F. Staubly
Attorney—Edgar H. Kent

[57] ABSTRACT

A slotted screen for slurry is produced by Electrical Discharge Machining the slots in groups in a curved screen plate of metal at least one-eighth inch thick immersed in a dielectric liquid. The slots are formed by two sets of electrodes successively applied, the first set producing indentations extending partially through the plate, the second set forming narrower slots extending from the base of the indentations through the remaining thickness of metal.

7 Claims, 6 Drawing Figures

PROCESS OF MAKING A METAL SCREEN

This is a division of Application Ser. No. 50,136 filed June 26, 1970, now U.S. Pat. 3,664,502.

This invention relates to a method of manufacturing tubular slotted screens suitable for screening slurry, particularly paper pulp fiber slurry, and to a novel slotted screen produced thereby.

Screens of the type concerned are formed of metal plate rolled and welded to tubular form and provided with a multiplicity of screening slots. To withstand the pressures involved, relatively heavy gauge metal is used such as one-eighth to five-sixteenths inch stainless steel. The slots are usually fine on the inflow side, e.g., 0.010 to 0.020 inch wide, with a wider, longer portion on the outflow side called a "relief groove." The slots are formed by saws or cutting wheels frequently in a two-step operation which first forms the relatively wide relief groove portion on one side of the plate and then the relatively narrow screening slot extending through the opposite side of the plate. For reasons of practical economy in manufacture, the apertures have been formed simultaneously in large groups by ganged saws while the plate is flat, the plate being rolled to tubular form and welded after the slots have been completely formed.

Screens formed in this manner have been subject to certain deficiencies. The walls of the slots have not been as smooth as they should be due to the inherent tendency of mechanical metal removing equipment to tear out chunks of metal at the sides and to leave burrs. Furthermore, major difficulty has been experienced with breakage of such screens used in high pressure screening such as pulp screening. In a study of this costly problem it was ascertained that a major cause of breakage is stresses induced in the metal both by metal removal and by the subsequent rolling, which is aggravated by the shape of the slot ends which have sharp corners or angles corresponding to the side edges of the cutting tool which constitute focal points for strains to start cracks. Furthermore, the plate does not roll true but tends to bend on lands between slots so that it has a polygonal rather than the desired circular cross-section, again creating stressed zones prone to break.

Accordingly, it is an object of the invention to provide a method for manufacturing such screens which avoids the aforesaid difficulties with prior practice and yet is comparable thereto in cost. Another object is to provide a novel slotted screen produced by such method in which the slots have smoothly rounded ends free of corners or sharp angles between walls to induce breakage.

The method of the invention features forming the screen plate slots by an operation commonly called "EDM," the initials standing for Electrical-Discharge Machining. In this procedure electrodes connected to a high voltage source and having a shape complementary to and a size slightly smaller than the slots to be formed are located in close proximity, but out of contact, with the screen plate. The screen plate is mounted on an electroconductive grounded support and is submerged in a dielectric oil in the area being worked upon. The electric discharge from the electrodes to the screen plate produces sparks of minute particles of the plate metal which are quenched and removed in the oil. The electrodes are advanced into the slots being produced at the rate of metal removal so that a uniform discharge is maintained until the work is complete. The metal is removed in such minute particles that the walls of the apertures are smooth and slavishly conform to the profile of the electrodes.

Thus it becomes feasible by suitably shaping the electrodes to produce slots and relief grooves with smoothly rounded arcuate or bowl-shaped ends free of sharp corners or angles between walls to induce cracking which have characterized prior screens. The strains induced in the plate by mechanical working are absent, and there is no formation of burrs. The process is controllable so that tolerances as low as 0.001 inch and lower are readily maintained. In addition, the slots may be produced with end walls extending straight through the plate so that the lands between slot ends are free of the grooves which are produced by the run-out of rotary cutting tools when these are used to form the slots. Thus, for any given slot spacing the lands between their ends are stronger in screens made according to this invention than in the prior cut-slot screens.

Another important advantage of EDM formation of the screen slots is that the electrodes may be ganged and positioned in close proximity. It is therefore feasible to form the slots in large groups simultaneously and in the plate in its rolled tubular form which has not been feasible with the tools required for mechanical machining. Thus the local strains induced by rolling after aperture formation are eliminated and a screen of true circular cross-section is produced. In addition, by forming the slots in groups, EDM time and cost are reduced to a value comparable to mechanical machining of flat plate.

When screen plate is mechanically slotted in the flat state and rolled to tubular form, in addition to the crack inducing strains produced at the edges, the shape of the apertures is altered by virtue of the expansion of the outer surface and contraction of the inner surface of the plate. This distortion is substantial and its effect is to distort the slots undesirably. For example, slots arranged longitudinally of the axis are narrowed toward their inner faces to a considerable and irregular extent which may cause plugging in an inward flow screen. In the screen produced by my method, slotted in the tubular state, the slots remain in the exact shape in which they are formed.

The foregoing and other objects and advantages of the invention will be more fully understood form the ensuing particular description of preferred practice of the method and preferred slotted screens produced thereby, in conjunction with the accompanying drawings wherein.

Figure 1:
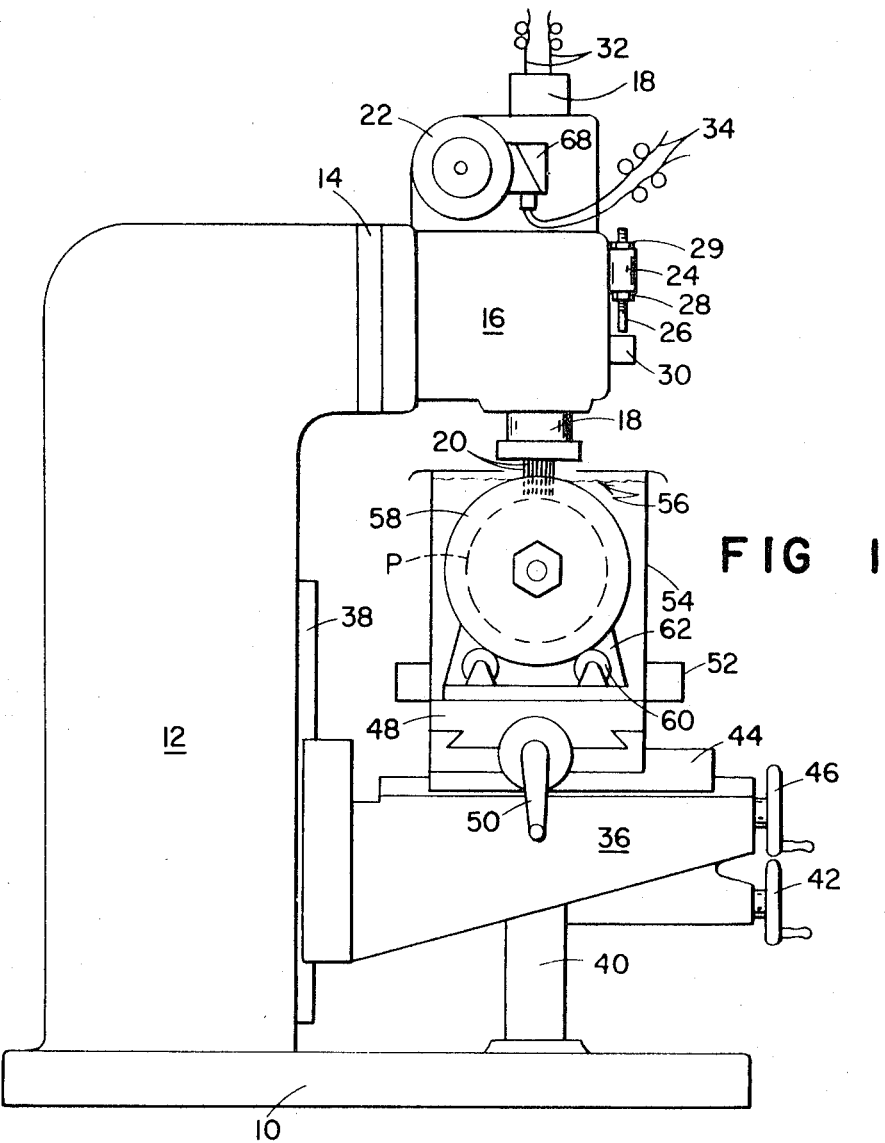
FIGS. 1 and 2 are diagrammatic side and front elevation views, respectively, of equipment for practicing the invention, FIG. 2 being partially in vertical section.
Figure 2:
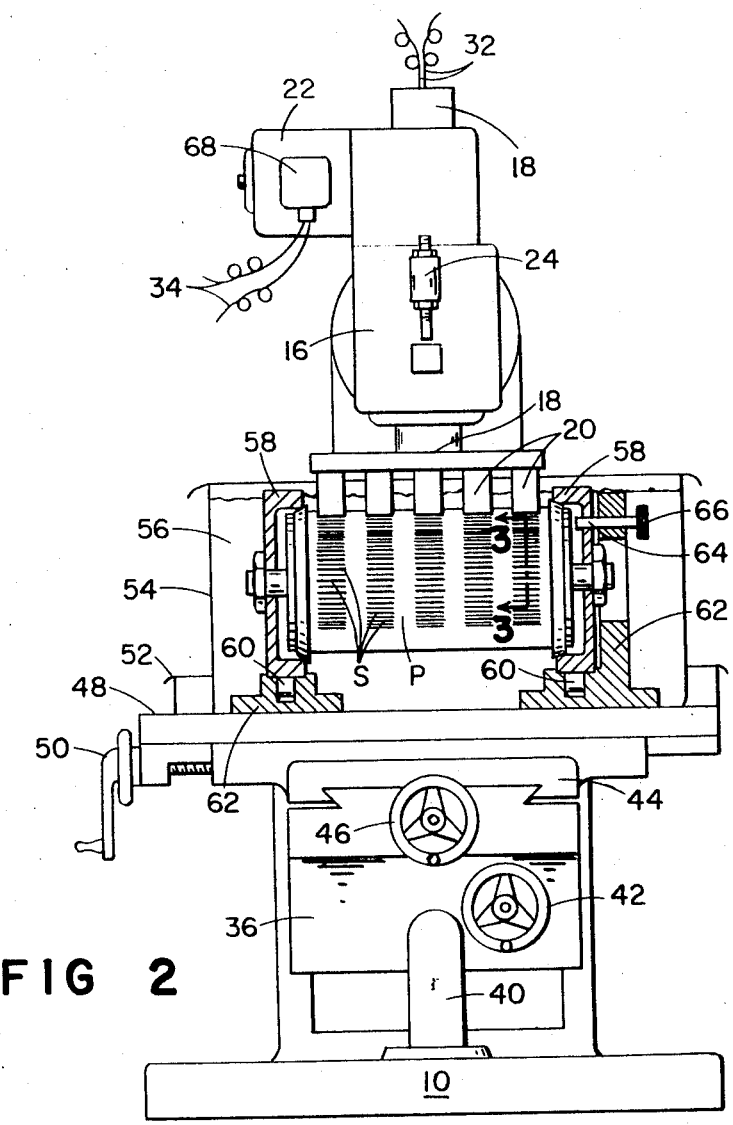

Describing first the process, FIGS. 1 and 2 show EDM equipment, such as machines commercially available under the trade name Elox, having a base 10 on which is mounted a stand 12 having at its upper end an arm 14 which carries a support 16 in which is vertically slidable a plunger 18 which carries electrodes 20. Plunger 18 is reciprocally moved by motor 22 to advance and retract the electrodes. The plunger carries a lug 24 extending through a slot in support 16 (not shown) through which adjustably extends a threaded micrometer pin 26 held by nuts 28, 29 and acting against a stop 30 on support 16 to limit downward movement of plunger 18 according to predetermined desired depth of penetration into the work. Electrodes 20 and motor 22 are connected to suitable sources (not shown) of electric current by leads 32 and 34, respectively, leads 32 being connected to a source of pulsating electric current, usually DC.

A bed plate 36 is slidable at one end on ways 38 mounted on stand 12 and is vertically adjustable with respect to post 40 by suitable gearing (not shown) operated by hand wheel 42. A first support plate 44 is dovetailed on the top of bed plate 36 for in and out sliding adjustment by gearing (not shown) operated by hand wheel 46. A second support plate 48 is dovetailed on the top of plate 44 for lateral sliding adjustment by gearing (not shown) operated by crank 50. A drip pan 52 on plate 48 receives tank 54 containing dielectric oil 56 in which the work is immersed, the work in this case being cylindrical screen plate P in which five axially spaced circumferential rows of slots S have been partially completed.

Screen plate P is clamped at its ends in arbors 58 which are rotatably mounted on rollers 60 mounted in the base of suitably grounded stands 62 in tank 54. A series of index holes 64 drilled at predetermined spacing circumferentially of one of the arbors 58 receives a releasable detent pin 66 in the corresponding stand 62.

In practicing the method of the invention with EDM equipment such as has been described a screen plate is rolled and welded in tubular shape and is clamped in arbors 58 with detent pin 66 in a first index hole 64. Hand wheels 42, 46 and crank 50 are operated to position the rolled plate P properly below the electrodes 20 and motor 22 is operated to move plunger 18 down until the electrodes are in operating position with respect to plate P. Tank 56 is filled with dielectric oil until plate P is fully immersed. Micrometer pin 30 is adjusted so that its end is spaced above stop 30 an amount equal to the depth to which the electrodes are to penetrate the plate. The current to motor 22 and electrodes 20 is switched on and a variable speed adjustment control 68 on motor 22 is set to a speed which will lower plunger 18 at the rate of metal removal (up to 0.05 cubic inches per ampere hour). When pin 26 reaches stop 30 the circuits to the motor and electrodes are opened and a reversing switch in the circuit to the motor may be operated to retract the plunger and withdraw the electrodes. Detent pin 66 is released, arbors 58 are rotated so that pin 66 can be inserted in the next index hole 64, the machining operation is repeated and so on until the entire circumference of plate P has been machined.

As a specific example, it may be required to provide a 12 inch diameter screen plate P of 1/4th inch thick stainless steel with 1520 slots S one and one-half inches long arranged in 5 circumferential rows spaced apart and from the ends one inch. The slots S may have a fine portion at the inlet face (inner) of the screen plate of approximately 0.010 inch width extending one-thirty-second inch through the plate and a wider undercut relief portion about 0.060 inch in width extending the remaining distance through the plate to its outer face. The centerlines of the slots may be spaced apart one-eighth inch and approximately one inch of circumference may be machined at one pass so that there will be 40 electrodes 20 on plunger 18 spaced and sized to provide the required pattern of slots in five rows of the 1 inch of circumference and there will be 38 index holes 64 corresponding to the required 38 successive machining operations to complete the work.

While it is possible to form the slots as described with a single set of electrodes and 38 successive operations, actually it is preferred to employ two different sets of electrodes, a first set sized to produce the undercut relief portion and the other set sized to produce the fine portion of the slot through the base of the relief portion. Although this procedure requires twice as many operations, it actually saves time because the relatively large volume of metal removal required to form the relief portions may be accomplished at relatively high amperage and high metal removal speed in consequence. While at high amperages the machined walls are not as smooth and regular as at low amperage, this is much less important in the relief portion than in the fine portion, which is machined in a second operation at low amperage to provide the critical smoothness and regularity for this portion. Thus the large relief portions may be formed in about 20 minutes per index pass with current of about 30 amperes and the fine slots may be formed in about the same time with current of about 4 amperes. In addition to time saving involved in the two step process, it is difficult to remove the fine metal machined particles from such a fine slot portion being machined simultaneously with a much larger portion, even with circulating dielectric.

The process has been described so far as applied to the production of an outward flow screen with fine slot portions on the inside face and relief portions on the outside face. Of course, if the slots do not have relief portions, it is possible to form either an inward flow or an outward flow screen by the external machining so far described. However, if an inward flow screen with relieved slots is desired, certain changes may be made in the equipment to enable the machining to be done from the inside of the rolled screen plate.

For example, holder 18 may have attached thereto a yoke the side arms of which extend downwardly beyond the opposite ends of a screen plate positioned as shown in FIGS. 1 and 2. An electrode-carrying bar assembly may be detachably connected to the ends of these arms, arbors 58 being replaced by ring-type clamps sufficiently open at the center to permit the ends of the electrode assembly bar to extend through them and to reciprocate vertically to the required extent when attached to the yoke arms. The ends of each group of electrodes are arranged in convex formation transversely of the screen axis rather than concavely as shown in FIG. 1. The slots are then machined from the inside to the outside of the plate in the same way described for machining from the outside of the plate save that the level of oil in tank 54 need be sufficient only to immerse the sector of the plate being worked upon, a first machining providing the relief portions of the slots on the inside of the plate and a second machining providing the fine portions extending through the outside.

In FIG. 2 the slots are shown as formed with their long axes parallel to the axis of the screen plate. This is desirable in many cases, but actually the slots may be formed with their long axes at any desired angle to the screen plate axis as determined by the directional set of the electrodes on their holder.

Figure 3:
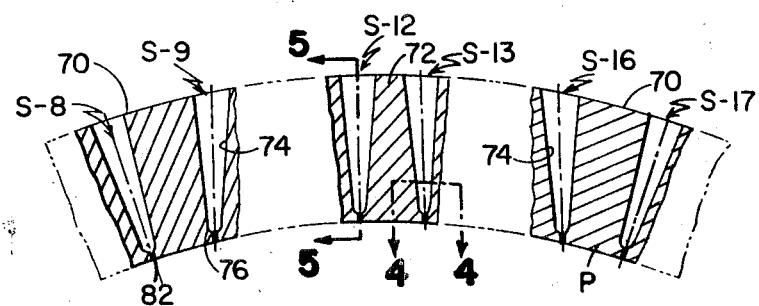
FIG. 3 is a greatly enlarged fragmentary, section view through a slotted portion of the screen shown in process in FIGS. 1 and 2, the section being taken on lines 3—3 of FIG. 2, looking in the direction of the arrows.

Turning now to a description of the novel slotted screen structure which may be produced by the method of the invention, FIG. 3 is a partial greatly enlarged view of three successive groups of eight slots formed in three successive index passes (or six such passes where the slots are formed in two steps) with the equipment of FIGS. 1 and 2, indexing counterclockwise as viewed in FIG. 3. The first slot shown to the left is the last slot of the first group and is designated S-8. The next four slots are, respectively, the first, fourth, fifth and eighth slots of the second group and accordingly are designated S-9, S-12, S-13 and S-16, respectively. The last slot to the right is the first slot of the third group and is designated S-17.

It will be noted that slots S-9, S-12, S-13 and S-16 have their long axes parallel to each other and to the screen plate axis, and this is characteristic of all the slots of each group which, however, have their said axes at an angle to the long axes of the slots of the immediately preceding and succeeding groups. Where slots are formed in flat plate which is then rolled to tubular form with the axis of the tube parallel to the long axis of the slots, that slot axis is essentially radial to the tube axis and therefore at an angle to the immediately preceding and following slots. The angularity of the slots of each group to the slots of immediately preceding and following groups produces a land 70 between the last slot of one group and the first slot of the next group which is somewhat larger at the outflow face of the screen than the lands 72 between successive slots within a group.

Figure 4:
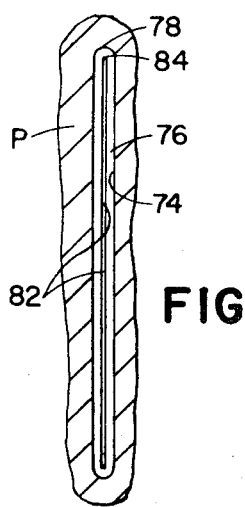
FIG. 4 is a section view on line 4—4 of FIG. 3 looking in the direction of the arrows.
Figure 5:
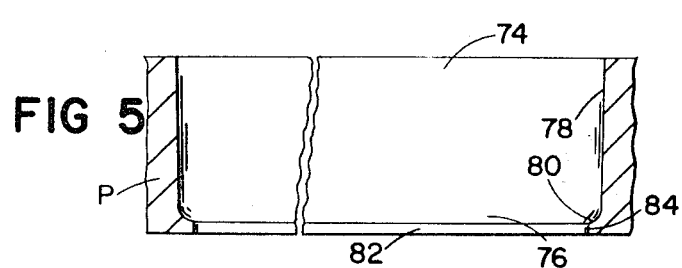
FIG. 5 is a section view on line 5—5 of FIG. 3, looking in the direction of the arrows.

FIGS. 3-5 show a preferred slot shape in which the relief portion has outwardly sloping side walls 74 which are curved inwardly about an axis parallel to the slot axis on a small radius at their inner ends 76. This portion has end walls 78 which are concavely curved transversely about a center midway between the side walls 74 on a radius of about half the distance between the side walls to provide a curvature substantially semicircular in cross-section having a smooth tangential juncture with the sidewalls. The inner end of each end wall is also concavely curved inwardly longitudinally of the slot at 80, this curvature corresponding to that of the sidewall ends 76. The fine portion of the slot has side walls 82 that are straight and parallel to the long axis and end walls 84 that are concavely curved transversely of the slot to provide a curvature substantially semicircular in cross-section which has a smooth, tangential juncture with the sidewalls like that of end walls 78. It will be appreciated that the electrode, or pair of electrodes, which form each slot will have a shape complementary to, but slightly smaller than, the slot portion formed thereby.

This preferred form of slot has only walls that are flat or concavely curved and only curved junctures between adjoining walls. It is therefore free of sharp concave angles between walls and in particular of sharp indented corners at the ends, both of which are necessarily characteristic of mechanically machined slots and which I have found to be a major cause of slotted screen breakage in the past. There are fewer burrs to interfere with fiber passage through the slots and the walls are smoother, with less cracks and fissures than in the case of mechanically machined slots, the smoothness being somewhat greater in the fine portion where it is most important if this portion has been formed at lower amperage.

Figure 6:
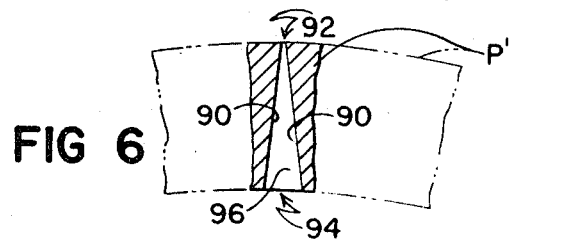
FIG. 6 is a fragmentary transverse section view through a slot of modified transverse cross-sectional shape.

FIG. 6 shows also greatly magnified a modified shape for slots formed accordingly to the invention in a tubular screen plate P' which is of the inward flow type and therefore has the fine ends of the slots on the outside of the plate. This form of slot has flat sidewalls 90 which diverge uniformly from the fine inlet end 92 to the wide outlet end 94. Each end wall 96 is concavely curved transversely on a radius preferably about half the width of the groove and therefore on a radius which increases proportionately as the slot width increases. Each end wall 96 is preferably also inclined outwardly similarly to the side walls so that the fine inlet end 92 of the slot has undercut relief at the ends as well as the sides.

The form of slot shown in FIG. 6 has generally the same advantages as that of the other Figures. However, I generally prefer to have a short fine inlet portion of substantially uniform dimensions as this is better resistant to change in the inlet dimensions due to wear.

It will be appreciated that slots of various other longitudinal shapes than are shown (e.g. heringbone) may be produced, as the process is most versatile in this respect. However, it is important that the electrodes be formed to produce smooth rounded junctures between walls particularly at the ends and to avoid the formation of sharp angular indents or corners as the process readily permits.

I claim:

1. A process of forming a slotted screen for screening slurries from curved metal screen plate at least about one-eighth inch thick which includes the steps of:

immersing in a dielectric liquid a section of said plate to be slotted;

positioning contiguous to a surface of said section a first multiplicity of spaced electrodes, each electrode having a shape complementary to a partial depth of slot to be formed extending from said surface toward the opposite surface;

applying electric current to said electrodes sufficient to produce an electric discharge from each electrode to the metal of said section opposite the same which discharge machines said metal by removing small particles thereof as sparks that are quenched in said dielectric liquid to form an indentation in the metal opposite each electrode complementary in shape to the electrode and extending only partially through said plate;

relatively moving said plate and said electrodes in the direction to project said electrodes into said indentations and at the rate of metal removal by said electric discharge until said depressions have reached the desired depth;

separating said electrodes from said section;

positioning in alignment with each of said indentations an electrode of a second multiplicity of spaced electrodes having a length not greater than and a thickness substantially less than the width of said indentations;

relatively moving said plate and said second electrodes toward each other while applying electric current to said second electrodes of substantially lower amperage than the electric current applied to said first electrodes but sufficient to produce an electric discharge to machine as aforesaid the metal remaining between said indentations and the opposite surface of said section to form therein slots complementary in shape to said second electrodes extending from the opposite surface of said section into said indentations; and separating said second electrodes from said section.

2. A process according to claim 1 wherein said indentations are deeper than said slots.

3. A process according to claim 1 wherein said screen plate is a tube of circular cross-section.

4. A process according to claim 3 wherein said first and second electrodes are spaced circumferentially of said section and are ganged in groups spaced axially of said section.

5. A process according to claim 4 wherein said steps are repeated on other sections of said plate.

6. A process according to claim 1 wherein said first and second electrodes have convexly curved sides for forming complementary ends of said indentations and slots respectively.

7. A process according to claim 6 wherein said first electrodes also have convexly curved ends for forming complementary bottoms of said indentations.

* * * * *

PO-1050
(5/69)

UNITED STATES PATENT OFFICE
CERTIFICATE OF CORRECTION

Patent No. 3,748,428      Dated July 3, 1973

Inventor(s) John B. Brown

It is certified that error appears in the above-identified patent and that said Letters Patent are hereby corrected as shown below:

Claim 4 should read as follows:

-- The apparatus of claim 3 wherein the means for counting the digits of light consist essentially of a first spherical lens, an oscillating mirror, a second spherical lens, an opaque barrier with a slit having a short dimension about equal to the size of the image of a grid line, a photocell, and a counter, said components positioned such that the digitized light, after passing the object to be measured, is, in sequence, converged by said first spherical lens, reflected by said oscillating mirror, recollimated by said second spherical lens, passed through said opaque barrier slit, detected and converted to electrical signals by said photocell, and the signals counted by said counter--.

Signed and sealed this 24th day of September 1974.

(SEAL)
Attest:

McCOY M. GIBSON JR.
Attesting Officer

C. MARSHALL DANN
Commissioner of Patents